United States Patent [19]

Olson et al.

[11] 3,977,729

[45] Aug. 31, 1976

[54] OUTDOORS REFUSE-RECEIVING SYSTEM

[75] Inventors: Dag Olson, Sodertalje; Jarl Erik Berggren, Solna, both of Sweden

[73] Assignee: AB Centralsug, Solna, Sweden

[22] Filed: Feb. 19, 1974

[21] Appl. No.: 443,640

[30] Foreign Application Priority Data

Feb. 20, 1973 Sweden .............................. 7302382

[52] U.S. Cl. ...................................... 302/27; 193/33

[51] Int. Cl.² ........................................... B65G 53/46

[58] Field of Search .................. 193/33, 34; 362/27, 362/39, 42

[56] References Cited

UNITED STATES PATENTS

| | | | |
|---|---|---|---|
| 1,576,125 | 3/1926 | Yeo | 193/34 X |
| 1,632,536 | 6/1927 | Breen | 193/34 |
| 1,733,801 | 10/1929 | Heybeck | 193/34 |
| 2,480,685 | 8/1949 | Adams | 193/34 X |
| 3,419,209 | 12/1968 | Munn | 302/14 X |
| 3,490,813 | 1/1970 | Hallstrom | 302/27 X |
| 3,687,503 | 8/1972 | Ekstrom et al. | 193/34 X |

FOREIGN PATENTS OR APPLICATIONS

| | | | |
|---|---|---|---|
| 399,739 | 8/1924 | Germany | 302/39 |
| 168,651 | 4/1934 | Switzerland | 193/34 |
| 25,181 | 10/1910 | United Kingdom | 193/34 |
| 1,024,703 | 4/1966 | United Kingdom | 302/27 |
| 1,084,689 | 9/1967 | United Kingdom | 302/27 |

*Primary Examiner*—Evon C. Blunk
*Assistant Examiner*—Jeffrey V. Nase
*Attorney, Agent, or Firm*—Spencer & Kaye

[57] ABSTRACT

The invention refers to an outdoor refuse-receiving system comprising an underground suction conveying conduit connected to and forming part of a suction-operated refuse collecting system and a plurality of mutually spaced refuse-receiving chutes at least some of which are self-contained posts accessible from public walking areas and which at the lower ends each are in refuse transferring communication with said conveying conduit, each such post being a hollow column provided at the upper end with sluice-like refuse-inserting means.

The invention also refers to a sluice-like refuse-inserting means for attachment to the upper end of a chute forming part of a suction-operated refuse collecting system, said refuse-inserting means comprising: a housing having an inserting opening and, on a lower level, a discharge opening adapted to communicate with the upper end of a chute; an adjustable element bounding a refuse receiving cavity; and means for adjusting said element alternatively in a position in which said cavity is accessible from the environment through said inserting opening and closed at said discharge opening and a position in which said cavity is inaccessible from the environment through said inserting opening and open at said discharge opening.

19 Claims, 10 Drawing Figures

OUTDOORS REFUSE-RECEIVING SYSTEM

In modern dwelling areas suction-operated garbage disposal systems are often provided, such systems as a rule comprising an underground collecting conduit which at the one end is connected to a suction machine unit and to means for separating the garbage from the conveying air stream and which directly or via branch conduits receives garbage which by means of disposal ports provided on every floor in every house is introduced into collecting chutes which at the lower end are in communication with the collecting conduit or a branch conduit. There is also a need for a corresponding system in less densely populated areas such as garden suburbs and also along roads and streets, on squares, in particular marketing places, in parks, camping sites, station buildings, station platforms and similar environments where so far, at best, garbage bags or waste-paper baskets were provided. In all cases in which such places are within the operational reach of a garbage suction system, such as an ordinary garbage suction system for a dwelling area, it appears particularly desirable to provide an easily accessible receiving system for litter, garbage and similar refuse which system is safe and fulfils environmental requirements and thus advantageously replaces present-day paper baskets and garbage collecting bags and similar arrangements.

In such a case, in accordance with the present invention, several insertion chutes, at least in part self-contained, are connected at spaced intervals — chosen with in respect to the expected amounts of refuse — to an underground suction conveying conduit communicating with a refuse suction system, with the end above ground of every chute being constituted by a hollow column having sluice-like refuse receiving means provided at the upper end of the column. Preferably, the refuse receiving means are dimensioned to receive larger amounts of refuse such as bags filled with household garbage, while the construction of such refuse receiving means as a sluice eliminates the risk for personal injury, in particular with respect to playing children, and reduces the susceptibility of the system to damage. If, in accordance with one aspect of the invention, the refuse receiving means at the upper end of a column comprise an inserting opening and an adjustable sluice element in the form of a rotatable cylindrical drum, every refuse receiving means, in a receiving position, can serve as a normal waste-paper basket which, if required, is emptied by operating the drum for rotation from the receiving position to a discharging position.

Due to the fact that the refuse receiving means are designed as a sluice and in particular due to the fact that in accordance with preferred embodiments of the invention the sluice element is shaped as a cylindrical drum which is rotatable within a casing in part embracing the circumference of the drum, the risk is also eliminated that a subatmospheric pressure prevailing in the interior of the suction system behind the sluice element can come into action in the inserting opening or that air is improperly drawn into the system.

The invention is described in detail by reference to the enclosed drawings. In the drawings FIG. 1 illustrates, partly in elevation and partly in section, a self-contained insertion chute connected to an underground suction transport conduit and provided in accordance with the invention with a sluice-like refuse receiving means;

Figure 5A:
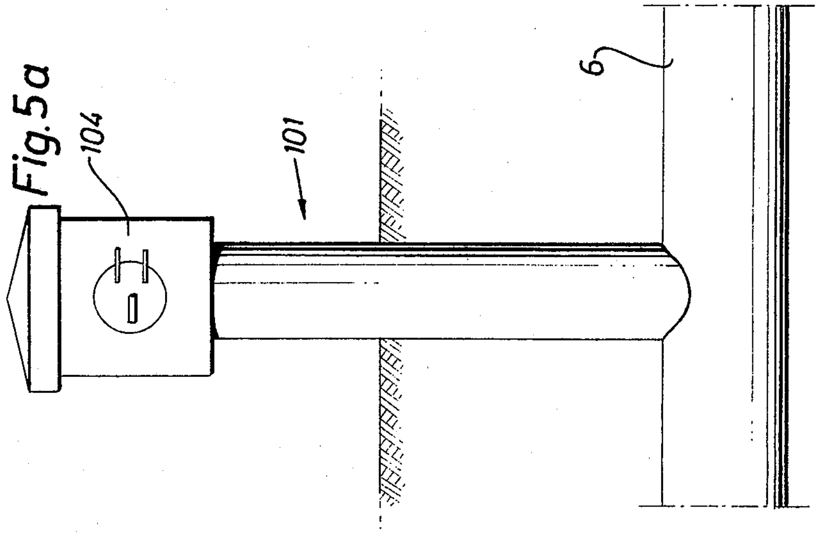
Figure 5B:
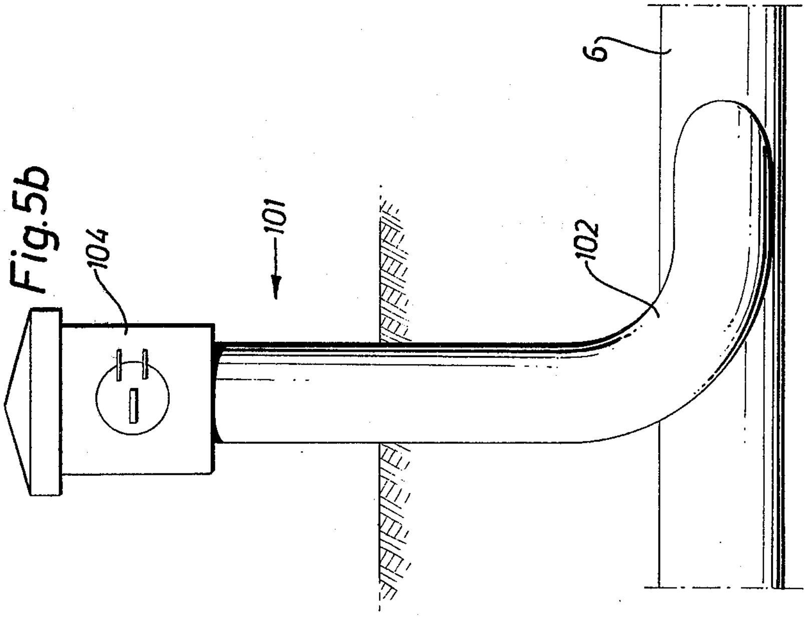
Figure 6:
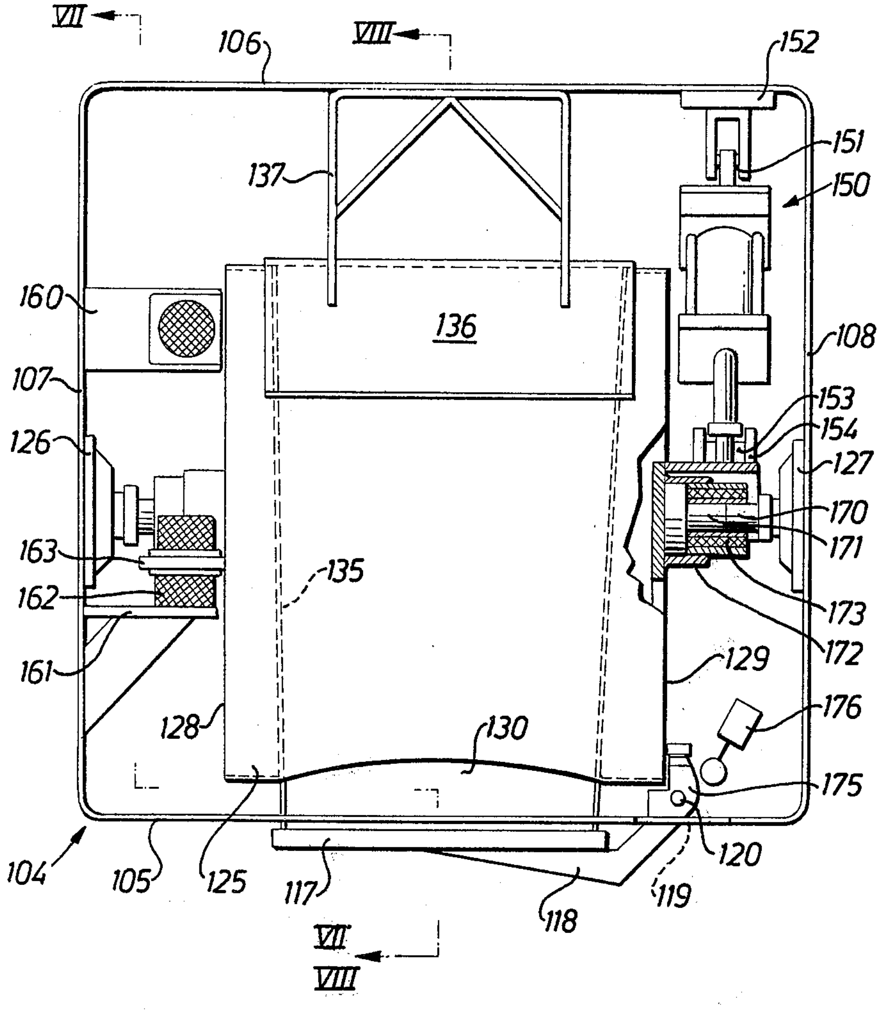
Figure 7:
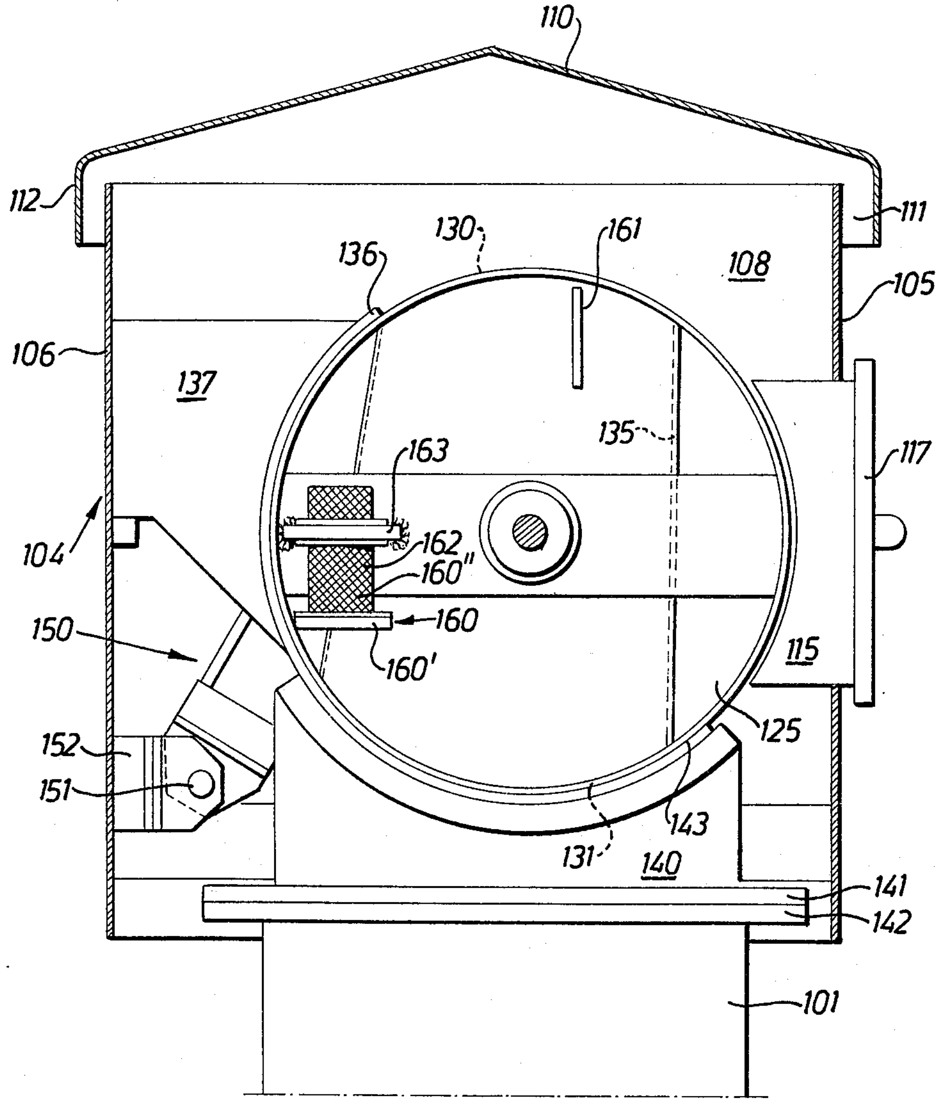
Figure 8:
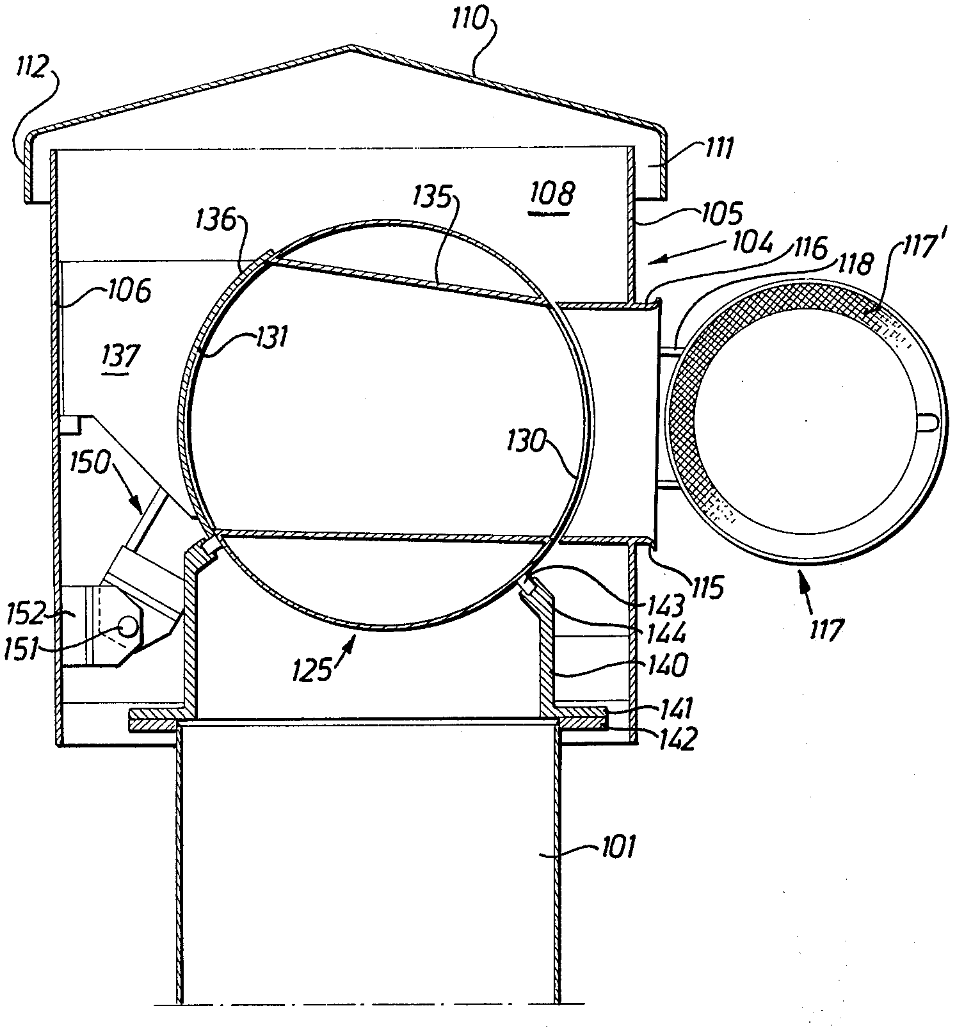
Figure 9:
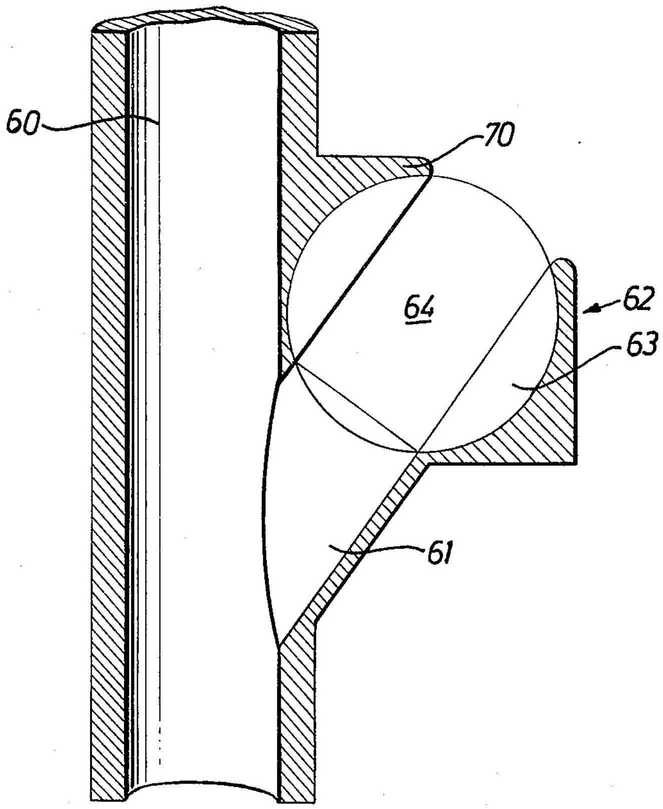

FIGS. 5*a* and 5*b* respectively illustrate two modes of direct connection of insertion chutes to an underground collecting conduit;

FIG. 6 is a plan view with parts broken away and the roof removed of an alternative embodiment of a sluice-like refuse receiving means arranged on top of an insertion chute;

FIG. 7 is an elevation of the same refuse receiving means as in FIG. 6 viewed from the left in FIG. 6 and with the left-hand side wall and parts of the front wall shown in FIG. 6 removed substantially along line VII—VII in FIG. 6;

FIG. 8 is a vertical sectional view of the refuse receiving means of FIGS. 6 and 7 substantially along line VIII—VIII in FIG. 6; and FIG. 9 illustrates the provision of refuse receiving means in connection with an insertion chute which at the upper end has a sluice-like refuse receiving means according to the invention.

Figure 1:
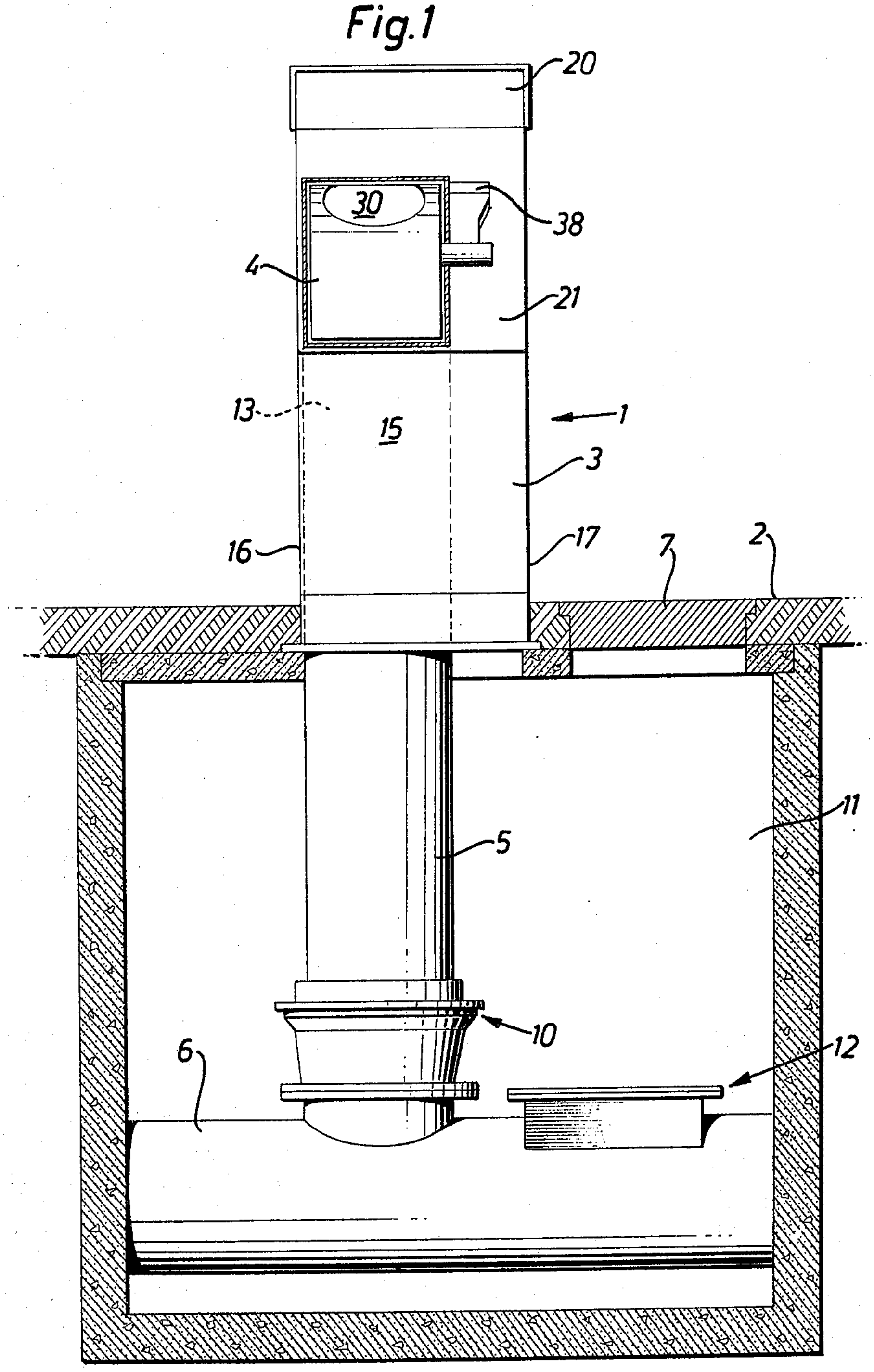

FIG. 1 illustrates a first embodiment of an insertion chute 1 comprising a hollow column 3 positioned above the ground surface 2 and having at the upper end a sluice-like refuse receiving means 4. In continuation of and in open connection to the interior of the hollow column 3 below the ground surface 2 a chute portion 5 extends downwardly into connection with a substantially horizontal underground collecting conduit 6 which is connected to a refuse suction conduit system and in which at least during certain periods of time a suction-produced conveying air stream is flowing.

In accordance with a constructive principle common in garbage suction systems, a valve arrangement 10 is provided in the lower end of the underground chute portion 5, said valve arrangement comprising a swingable or shiftable valve element (not shown) which normally closes the lower end of the chute and which can be operated so as to open a connection between the lower end of the chute and the interior of the collecting conduit 6. Litter, garbage and similar refuse inserted into the inserting chute 1 will normally be collected on the valve element and will be discharged periodically or when need has been found to exist by remote-controlled operation of the valve element to opening position. Obviously, the advantage of such a way of operation consists in that the subatmospheric pressure in the collecting conduit does not have to be maintained incessantly but only during certain emptying periods under which the valves of the individual chutes are operated in turn thereby causing the garbage to be distributed in a way favorable from the point of view of operation over the length of the collecting conduit while discharge is being performed.

Another possible mode of operation consists in that every valve 10 is discharged according to need, for example, when a certain height of collected refuse on the valve has been reached as detected, for example, by an electro-optical device, the refuse being introduced into the collector conduit 6 independently of the state of operation prevailing there. The collecting conduit is constantly or periodically subjected to subatmospheric pressure for removal of refuse introduced therein.

As shown in FIG. 1, the lower part 5 of the insertion chute, the valve 10 and the connection to the collecting conduit 6 are enclosed in a chamber 11 which may be accessible from the street through an opening closed by a lock 7 and within which there is also provided a normally closed access aperture 12 leading to the interior of collecting conduit 6 and permitting ingress into this conduit, for example, in case of clogging or obstruction of the conduit, in particular in the neighborhood of the connection of the insertion chute.

Figure 2:
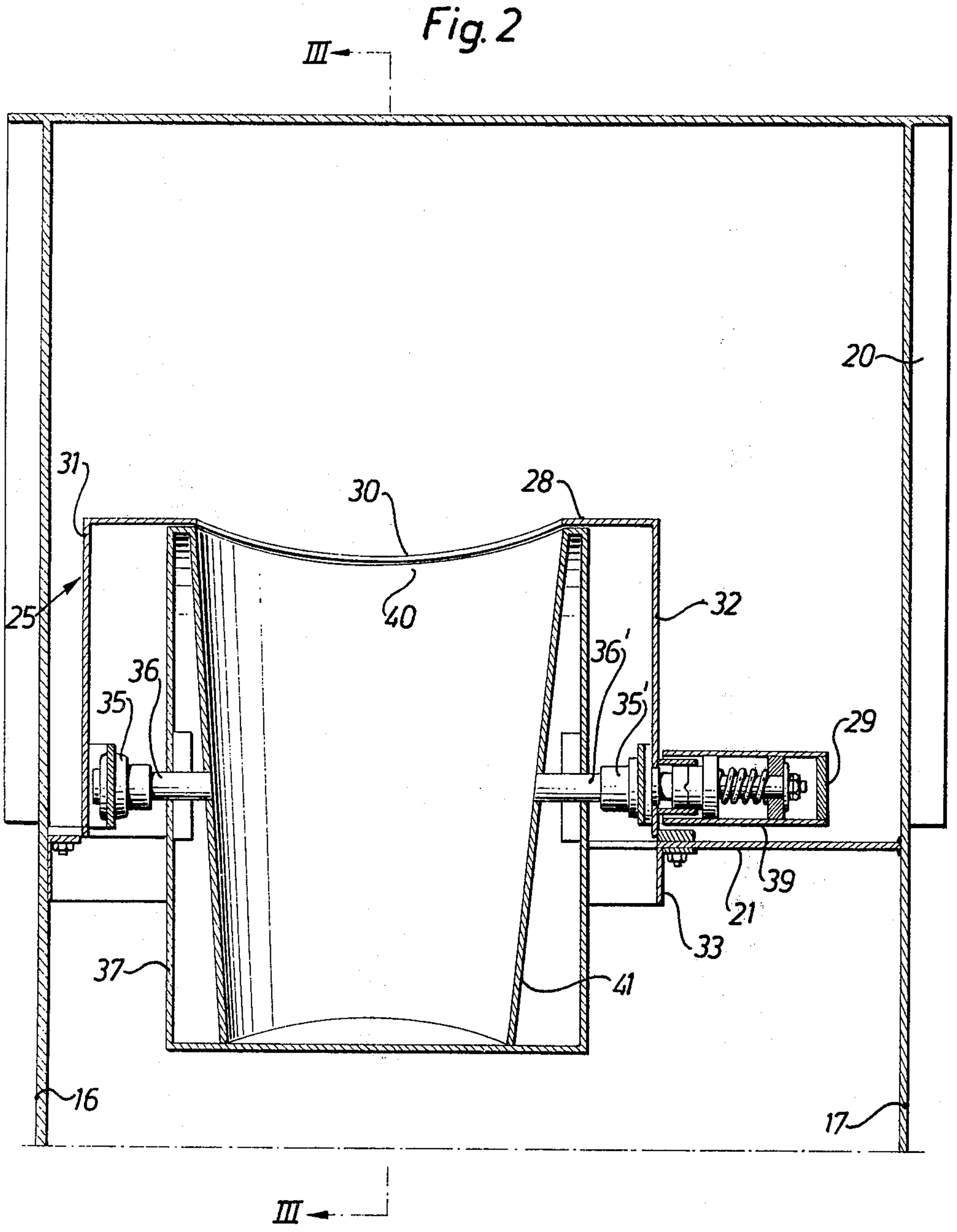
FIG. 2 is a section along line II—II in FIG. 1 of the refuse receiving means and sluice element.
Figure 3:
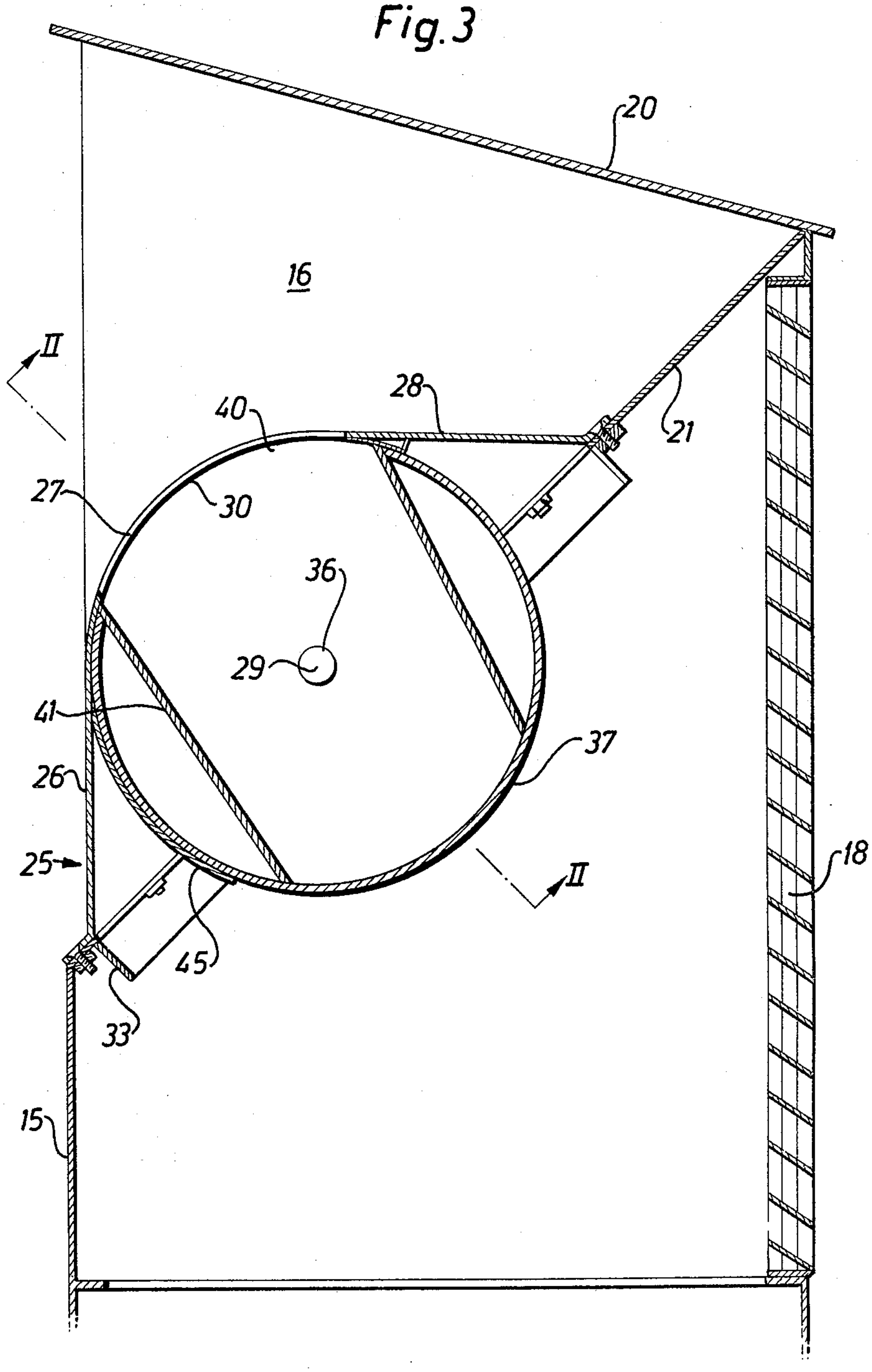
FIG. 3 is a vertical section along line III—III in FIG. 2 of the refuse receiving means perpendicularly to the axis of rotation of the sluice element.

In the embodiment illustrated in FIGS. 1, 2 and 3 the upper, column-like part of the insertion chute 1 is shown having rectangular cross-section, it being understood that this column may have any suitable cross-sectional shape other than the rectangular shape shown. The column 3 or a space 13 delimited therein and communicating with the refuse receiving means 4 proper merges at the lower end into the underground chute portion 5 which suitably has circular cylindrical shape, the transition between the two chute portions being designed without steps on which inserted refuse might accumulate.

The construction of the refuse receiving means 4 proper of this embodiment is shown in detail in FIGS. 2 and 3.

The wall 15 which in FIG. 1 constitutes the forward wall of the chute column is of lesser height than the remaining walls of the chute. The side walls 16 and 17 extend approximately to twice the height of the front wall 15 and their upper edge is inclined from the front side to the rear of the column where the height of the side walls is the same as the height of the rear wall 18. Side walls 16 and 17 and rear wall 18 with their upper edges support a rearwardly inclined roof 20. As indicated in FIG. 3 the rear wall 18 is provided with a venting grid.

From the upper terminal edge of the front wall 15 a diagonal wall 21 extends to the inner corner between roof 20 and rear wall 18 and in abutment to the side walls 16 and 17, said diagonal wall either being integral with front wall 15 or connected thereto by screwing, welding or otherwise and also connected in an arbitrary way, such as by welding, to the rear wall 18, the roof 20 and the side walls 16 and 17. The diagonal wall 21 has an aperture covered by a hood 25, said hood comprising a portion 26 extending substantially vertically upward from the front wall 15 and at the upper end merging into a portion 27 which in a cylindrical curvature extends into the interior of the column and which in turn merges into a substantially horizontal portion 28, the rear edge of which is firmly connected to the diagonal wall 21. The curved wall portion 27 of the hood forms a portion of a circular cylinder, the axis 29 of which extends horizontally between the side walls 16 and 17 of the inserting column outwardly of the plane of the diagonal wall 21. Within the curved portion 27 the hood is provided with a circular opening 30. The left-hand end wall 31 of hood 25 as seen in FIGS. 1 and 2 is spaced only a short distance from side wall 16 of the inserting column whereas the distance between the opposed end wall 32 and side wall 17 is considerably larger. Both end walls 31 and 32 are tightly connected to the lateral edges of wall portions 26, 27 and 28 and to the surface of diagonal wall 21 along the edges of the aperture therein, diagonal wall 21 being reinforced about this aperture by a flange 33 extending into the interior of the column. Suitably, walls 15, 16, 17, 18, 21, roof 20, hood 25 and flange 33 consist of appropriate plate material.

A cylindrical drum 37, also consisting of plate, is supported within hood 25 on two stub shafts 36 and 36′ respectively which are rotatable in journals 35 and 35′ provided in the end walls 31 and 32 respectively, the axis of these stub shafts 36 and 36′ coinciding with axis 29 of the cylindrical wall portion 27 of the hood 25. The outer diameter of drum 37 substantially corresponds to the inner diameter of the cylindrical wall portion 27 so that the periphery of the drum is exposed in aperture 30 of hood 25 substantially with a tight fit. Over a sliding clutch 39 a handle 38 is connected to stub shaft 36′ extending into the large interspace between end wall 32 and side wall 17 of the column. The drum 37 is firmly connected to stub shaft 36′ whereby a swinging shift of handle 38 from the upper position shown in FIG. 1 forwardly and downwardly to a lower position at an angular distance of about 180° also causes drum 37 to be turned within hood 25 through the same angular range unless sliding clutch 39 comes into action due, for example, to blocking of the drum.

Drum 37 has a substantially circular aperture 40 in the circumferential surface in such a position that in the angular position of the drum as shown in FIG. 1 with handle 38 in its upper position the aperture 40 of the drum is positioned exactly opposite to aperture 30 in hood 25. Within aperture 40 a receiving vessel is delimited in the drum 37 by a continuous, slightly conical side wall 41 and the opposite portion of the circumferential wall of the drum within side wall 41, the interior of this vessel thus being accessible through aperture 30 in hood 25 in the position of drum 37 and handle 38 shown in FIGS. 1 and 2. By turning drum 37 by a forward and downward movement of handle 38 as seen in FIG. 1 the drum will be rotated from a receiving position to a discharge position in which aperture 40 of the drum is facing downwardly and a portion of the outer periphery of the drum roughly corresponding to the bottom surface of the receiving vessel is positioned within aperture 30 of hood 25, whereby this aperture will be substantially closed.

To retain litter, garbage and similar refuse inserted into the receiving vessel of the drum in the interior of the vessel until the rotational movement from the receiving position to the discharge position has been substantially completed, hood 25 comprises a baffle wall 45 arranged inside the vertical wall portion 26 and conforming at the upper end to the curved wall portion 27, said baffle wall 45 being conformingly adapted to the outer wall of drum 37 and having such an extension that the drum opening 40 during rotation of the drum will be exposed only after substantially full reversal of the drum.

Figure 4:
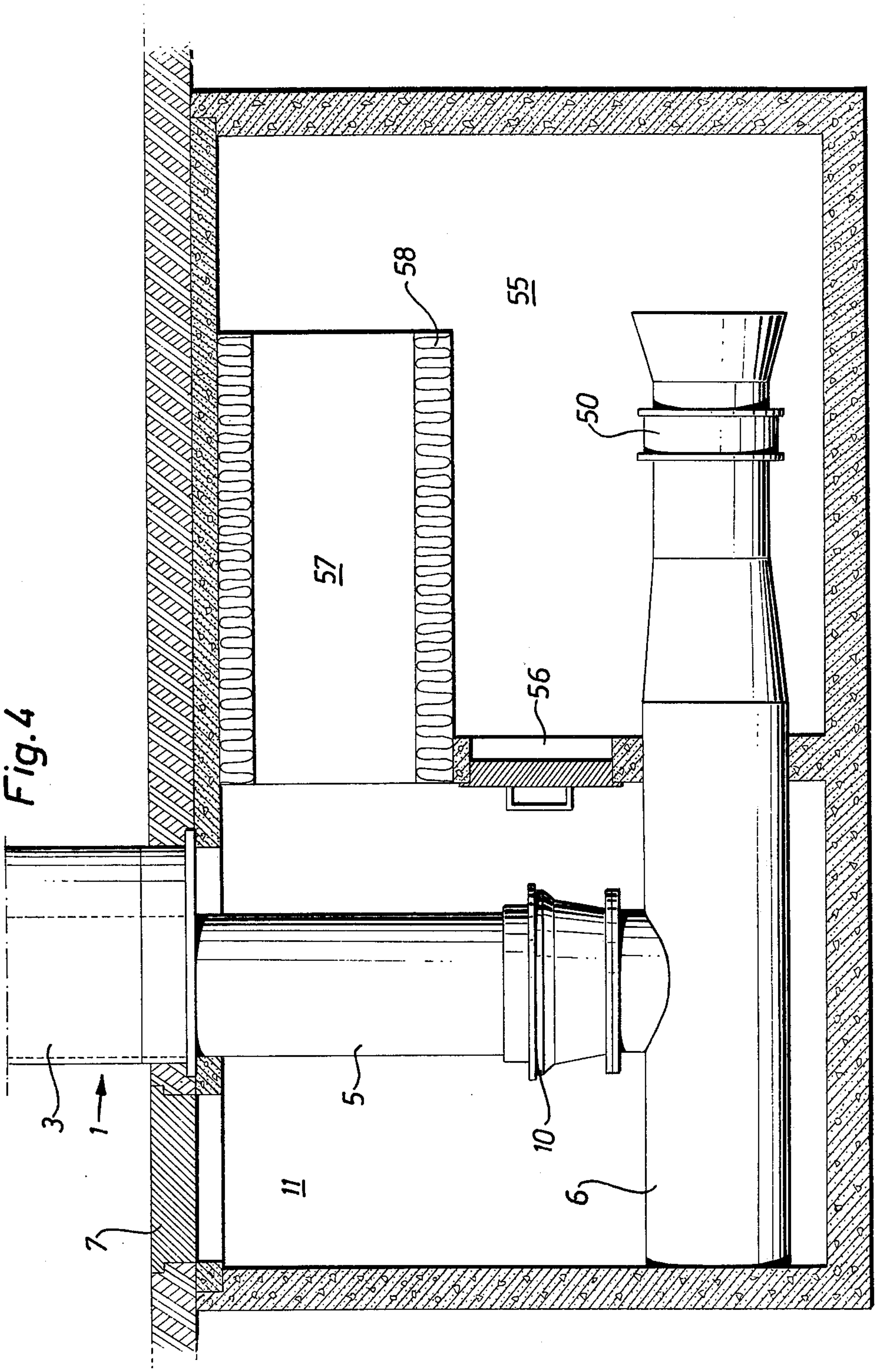
FIG. 4 illustrates the connection of the lower end of an insertion chute to a suction transport conduit the end of which is provided with an air admission valve.

FIG. 4 illustrates in a way partly corresponding to FIG. 1 the lower end 5 of an inserting chute, the upper, columnlike portion 3 of which may be assumed to have the same construction as in FIGS. 1 to 3.

Also in this case the chute 1 is closed at the lower end by a valve 10 for periodical discharge into the suction transport conduit 6 of litter, garbage and similar refuse inserted into the chute and temporarily collected on the valve element.

In this embodiment chute 1 is assumed to be the first chute counted from the beginning of suction transport conduit 6. Obviously, for starting and performing a suction transport phase through conduit 6 conveying air must be introduced from the rear end of the conduit, said rear end for this purpose here being shown as provided with a valve 50 which is opened under remote control when a conveying period is to be started.

When valve 50 is opened conveying air must of course be available at the then opened end of conduit 6. For this purpose, the end of conduit 6 and valve 50 are disposed within a particular underground chamber 55 which by a normally closed port opening 56 is in communication with chamber 11 in which the lower part 5 of the chute is connected to conduit 6. Air is supplied from chamber 11 into chamber 55 through a duct 57 which from an opening in the wall of chamber 11 extends substantially horizontally into chamber 55. The boundary wall 58 of duct 57 is preferably sound-insulated to avoid the extremely strong noise caused by inhalation of air into the open end of duct 57 from propagating into the environment of the insertion chute. Chamber 11 is in open communication with the cavity within column 3 and thereby with the outer atmosphere through the venting grid on the rear wall 18 of column 3.

Depending on the operating conditions, in particular the actual amounts of refuse, it is also possible completely to dispense with valve 10 so that refuse introduced into the insertion chute immediately falls down into the collecting conduit 6 to be continuously removed therethrough. A system of this type is schematically illustrated in FIG. *5a.* A continuous mode of operation with open connection between the insertion chutes and the collecting conduit may be advantageous in case litter, garbage and similar refuse is introduced into the system in comparatively great amounts and in an even distribution over extended periods of time. If direct connection of inserting chutes to a collecting conduit is to be combined with periodical operation of the suction system there may be some risk that excessive amounts of refuse inserted into a chute during the time interval between sucking periods may definitely block the conduit. In such cases a connection of the chute to conduit 6 as illustrated in FIG. *5b* may be preferable. Here a curved end extension 102 of a chute generally designated as 101 is laterally attached to collecting conduit 6. Refuse inserted into chute 101 during rest periods will be accumulated in the curved transition portion 102 of chute 101 and will be drawn into conduit 6 as soon as suction conditions are restored therein. Whenever a chute carrying refuse receiving means at the upper end is in direct open communication with a collecting conduit 6 under conditions of continuous or periodical operation of the system and accordingly in either of the modes illustrated in FIGS. *5a* and *5b* respectively, it will be necessary to provide for vacuum sealing means in the refuse receiving mechanism preventing air from being drawn into the system while the refuse receiving mechanism is in condition for receiving refuse. Accordingly, chutes 101 in FIGS. *5a* and *5b* are shown provided with a specific embodiment of refuse receiving means illustrated in greater detail in FIGS. 6 to 8 and exhibiting, in addition to other advantageous features, the property of sealing the interior of the chute against the surrounding atmosphere while the refuse receiving means generally designated as 104 are in condition for receiving refuse.

It is, however, to be understood that the embodiment of refuse receiving means to be described with reference to FIGS. 6 to 8 also may be used in connection with other types of chutes such as chutes comprising a bottom valve of the type of valve 10 illustrated in connection with the first-described embodiment. It is further to be understood that for example under conditions of less severe use less sophisticated types of refuse receiving means may be used also in such cases where chutes are connected to underground collecting conduits without the interposition of a bottom valve.

The refuse receiving means shown in FIGS. 6 to 8 and generally designated as 104 comprises a rectangular housing having four vertical walls, viz. a front wall 105, a rear wall 106 and left and right side walls 107 and 108 respectively. A roof 110 of a cross-sectional shape corresponding to the shape of the housing but of slightly larger dimensions than the housing is supported in a way not shown on top of the housing in such position that an air inlet space 111 is formed between a depending edge portion 112 of roof 110 and the uppermost portions of side walls 105, 106, 107 and 108.

Front wall 105 has a central aperture receiving a tubular insert 115 shown in section in FIG. 8 and in elevation in FIG. 7 and protruding on the front side of wall 105 in an outwardly flared edge 116 adapted to cooperate with a circular gasket 117' on the inner surface of a circular door generally designated as 117. The door 117 is being supported by an arm-structure 118 fixedly connected to the outer surface of door 117 and extending through an aperture 119 in front wall 105 into the interior of housing 104 where the arm-structure 118 is journalled for horizontal swinging movement about a vertical pivot 120 fixed in housing 104 a short distance behind front wall 105 by means not illustrated.

The inner end of tubular insert 115 is shaped in conformity to the outer circumferential shape of a circular cylindrical drum generally designated as 125 which is journalled in a way to be described later for rotation about a horizontal axis in permanently lubricated roller bearings 126, 127 attached to the inner surfaces of respective side walls 107 and 108.

Drum 125 is closed on end walls 128 and 129 and also closed on the cylindrical circumferential surface except for two apertures, viz. a smaller circular aperture 130 having the diameter of the insert 115 and provided in an axial position on drum 125 enabling the aperture to be adjusted in a position exactly in front of the inner end of insert 115 and a slightly larger circular aperture 131 positioned approximately but not exactly opposite aperture 130, the spatial relation between apertures 130 and 131 being illustrated in FIG. 8. As shown there, with aperture 130 adjusted to a position exactly opposite the inner end of insert 115, the lowermost point of aperture 131 will lie in approximately the same horizontal plane as the lowermost point of insert 115 and thus of aperture 130 whereas the uppermost point of aperture 131 will be situated at the higher level, it being understood that the centers of apertures 130 and 131 are positioned on the same radial plane on drum 125.

A frusto-conical wall 135 extends from the perimeter of aperture 130 through the interior of drum 125 to the perimeter of aperture 131. A cylindrically curved wall portion 136 having an angular extension slightly larger than the diameter of aperture 131 and an axial extension slightly less than the axial length of drum 125 but slightly larger than the diameter of aperture 131 and having an inner curvature conforming to the outer curvature of drum 125 is supported within housing 104 on a support structure 137 attached to rear wall 106 in the position illustrated in FIG. 8 in which the covering wall 136 closes aperture 131 in an angular position of drum 125 in which aperture 130 is situated exactly opposite the inner end of insert 115.

It will be understood that if door 117 is opened with drum 125 in the position illustrated in FIG. 8 refuse can be inserted through insert 115 into the space within drum 125 bounded by wall 135 and cover surface 136. During this phase of operation the outwardly flaring outer edge of insert 115 enables bags and packages containing garbage and other refuse to be inserted into drum 125 without risk of damage.

In the operational phase illustrated in FIG. 7 in broken lines as far as apertures 130 and 131 and wall 135 are concerned aperture 130 is in open communication with the inner space within housing 104 and accordingly in open communication via interspace 111 with the surrounding atmosphere. Aperture 131 now faces downwardly into chute 101 upon the upper end of which housing 104 is supported. In this position aperture 131 faces a slightly larger opening at the upper end of a vertically positioned cylindrical sealing element 140. By means of a flange 141 extending outwardly from the lower end of sealing element 140 the sealing element 140 is sealingly connected to the upper end of chute 101 having a corresponding outwardly extending flange 142 at the upper end. A gasket 143 is inserted into a groove extending around the enlarged upper edge 144 of sealing element 140, said gasket 143 extending from said groove into contact with the closed outer wall surface of drum 125 in the position as illustrated in FIG. 8 and with the outer wall surface of drum 125 on a zone surrounding aperture 131 in the position of drum 125 as illustrated in FIG. 7.

From the above description it will be evident that after insertion of refuse into the receiving space bounded by drum wall 135 and housing wall 136 and subsequent rotation of drum 125 to the position according to FIG. 7 the refuse previously inserted into the drum now will fall down through aperture 131 and sealing element 140 into chute 101, conveying air, if necessary, being available from the outer atmosphere through interspace 111, the interior of housing 104 and through drum aperture 130.

It will be understood that the rotation of the drum between the receiving position illustrated in FIG. 8 and the discharge position indicated in FIG. 7 may be performed manually in about the same way as in the embodiment of a receiving means described by reference to FIGS. 1 to 3. However, the embodiment illustrated in FIGS. 6 to 8 is here shown having a pneumatic (or hydraulic) operating mechanism generally designated as 150 and pivotally connected at 151 to a bracket 152 fixed to the inner surface of housing rear wall 106 and also pivotally connected at 153 to a bracket structure 154 outwardly extending from side wall 129 of drum 125. As such an operating mechanism of either pneumatic or hydraulic type is considered to be fully conventional a more detailed description of the construction and operation of the mechanism as well as of the pressure medium supply and controlling system of the mechanism does not appear to be required.

As illustrated in FIGS. 6 and 7 rotary motion of drum 125 is limited by abutments 160 and 161 extending from the interior of left housing side wall 107 into the housing to positions closely adjacent the left-hand end wall 128 of drum 125. Both abutments 160 and 161 are positioned in such a way as to come into contact with either side of a rubber damping element 162 carried by a bracket 163 attached, such as by welding, to drum end wall 128 in a sustantially radial disposition. While abutment 161 is shown as a simple plate element contacted by the one side of rubber damping element 162 in the refuse inserting position of drum 125, the other abutment 160 limiting the refuse discharge position of drum 125 is shown to comprise a bracket or plate 160' carrying on the side facing the rubber damper 162 a corresponding rubber damping element 160''.

As drum 125 during certain phases of operation will have to form a sealing closure for the upper end of chute 11, the journalling means on either side of the drum 125 comprise resilient means permitting the drum to be urged against gasket 143 with a slightly eccentric shift of position when a subatmospheric pressure is prevailing in conduit 6 and chute 101. The resilient mounting of drum 125 which is the same on both sides of the drum will be described by reference to the right-hand mounting shown in section in FIG. 6.

From bearing 127 a stub shaft 170 extends part way towards the drum. Extending from the right-hand drum end wall 129 and firmly connected thereto is a stub shaft 171, the ends of the stub shafts 170, 171 in the normal concentric position of drum 125 exactly facing each other. Concentrically surrounding stub shaft 171 and slightly spaced therefrom is a sleeve 172 firmly connected to end wall 129 of drum 125. Between sleeve 172 and stub shaft 171 there is inserted an annular resilient element 173 having such a length as to extend part way also over stub shaft 170, the resilient sleeve permitting sight eccentric displacement of stub shaft 171 in relation to stub shaft 170.

Normally also in the embodiment illustrated in FIGS. 6 to 8 the drum and housing will consist of plate. The operation of a refuse receiving arrangement as illustrated in FIGS. 6 to 8 is as follows: Normally the system will be operated intermittently. During periods of rest when there is no vacuum in the system refuse may be introduced in a way obvious from the above description by opening door 117 and inserting the refuse through insert 115 into the interior of the refuse receiving space bounded within drum 125 by walls 135 and 136. After closing door 117 a push button (not shown) is depressed to actuate the pneumatic or hydraulic unit 150 for turning drum 125 from the position illustrated in FIG. 8 to the position according to FIG. 7 whereby the refuse previously introduced into the drum will now be discharged into chute 101. It is to be noted that in an obvious alternative arrangement the impulse starting operation of mechanism 150 also may be automatically produced by closing door 117. The operating cycle released by pressing the push button or closing door 117 will be automatically completed after discharge of the refuse into chute 101 by a return movement of operating unit 150 and a restoration of drum 125 to the position depicted in FIG. 8. The electrical and/or fluid-controlled means provided for this drum discharge operation are fully conventional and do not require a more detailed description.

In order to safeguard against opening of door 117 with drum 125 in a position other than that shown in FIG. 8 arm structure 118 is provided with an extension 175 on the opposite side of pivot 120. The said extension 175 during opening of door 117 is received in a slot (not shown) provided in drum end wall 129 when during opening of door 117 drum 125 is in the correct receiving position according to FIG. 8, whereas the extension 175 in every other position of drum 125 will come into contact with the surface of end wall 129 thereby preventing door 117 from being opened.

The discharge of refuse collected in the lower ends of the various chutes belonging to the system is automatically initiated by means of a remote control mechanism in a predetermined sequence of the chutes along one collecting conduit and also of the various collecting conduits, this sequence being adapted to the capacity of the suction machinery and the throughput capacity of the conduits. Prior to starting such a discharge cycle, involving successive emptying of collected refuse from the various chutes forming part of the system, a state of vacuum must be established in the conduits to which the chutes are connected, such state of vacuum normally only being established intermittently during one such cycle of operation. Obviously, in very busy systems a state of vacuum may be maintained continuously at least during certain periods of the day when discharge cycles are performed at short intervals of time. If, under these conditions, a certain chute is to be emptied in turn the remote control mechanism transmits an operation release signal to the operating mechanism 150 causing it to turn drum 125 from the refuse receiving position of FIG. 8 to the refuse discharging position of FIG. 7. It will be understood that in the FIG. 7 position conveying air will flow into the refuse receiving space within drum wall 135 from the outer atmosphere through interspace 111 and the upper part of housing 104 whereby refuse collected in the lower part of chute 101 will be introduced into the conduit 6 to be conveyed to a refuse collecting station of normal type. After a predetermined interval of time sufficient to remove even the greatest amounts of collected refuse from the lower portion of chute 101, operating means 150 will again be actuated by a remote control signal or by a built-in restoring mechanism to return drum 125 to the receiving position, the drum in this position sealing the chute 104 against penetration of air in spite of the state of vacuum existing in the chute due to its open communication with conduit 6.

A limit switch 176 may be provided within housing 104 in a position to be actuated by arm 118 or its extension 175 when door 117 is opened, this switch 176 when actuated preventing the control mechanism of the system from actuating the chute 101 in question for discharge of garbage and other refuse collected in the lower end of chute 101 into collecting conduit 6. In other words, when door 117 is open at the scheduled time for discharge of this chute, this chute will be cut out from the ordinary operating cycle. Thereby, the serious risk of personal injury of sudden rotation of the drum during introduction of refuse will be eliminated. This safety system may be complemented by a signal such as a buzzer actuated by the general system control mechanism shortly before the chute is to be emptied in turn and warning against using the refuse receiving mechanism.

Thus, in a refuse collecting system in which the chutes are directly connected to the underlying collecting conduit without interposition of valves and in which discharge is performed intermittently and by successive operation of the various chutes in turn, the rotary drum of the refuse receiving mechanism described by reference to FIGS. 6 to 8, in addition to acting as a sluice permitting opening of the door only when the drum is in the receiving position, fulfils a double function in the discharge cycle of the whole system by either sealingly closing the upper end of chute 101 when a state of vacuum is prevailing in the conduit 6 and chute 101, drum 125 in this case being in the position according to FIG. 8, or acting as an air admission valve enabling the refuse collected in the chute in question to be discharged into conduit 6.

FIG. 9 shows the way in which a refuse receiving arrangement, for example, as described above in connection with respectively FIGS. 1 to 3 and FIGS. 6 to 8 may be used for introducing litter, garbage and similar refuse into a chute which is extended upwardly past the refuse receiving means. A need for such a construction may, for example, be encountered on railway and subway stations or in vestibules and corridores situated below an upper level, i.e. in cases where inserting chutes provided on upper platforms or on street level extend through underlying platforms and corridores where refuse inserting accommodations also are required. In this case a chute 60 which on an upper level, not shown, can be constituted by a column of the type shown in FIGS. 1 to 3 or 6 to 8, is provided on a lower level with an obliquely upwardly directed connecting duct 61 in the free end of which a refuse receiving arrangement 62 is provided. As far as the construction of the drum and receiving vessel is concerned this refuse receiving means 62 may substantially correspond to the arrangement specifically described above by reference to FIGS. 1 to 3 and 6 to 8 with only such differences as may be required regarding casing 70 in which the drum is rotatable. This casing 70 is here shown to be integral with chute 60 and the wall of the connecting duct 61 and, accordingly, casing 70 will consist of concrete or plate depending on the wall material used for the chute and the connecting duct. If casing 70 is made of plate it may have practically the same construction as, for example, hood 25 in the embodiment previously described by reference to FIGS. 1 to 3 with only such differences as are caused by the fact that the casing is required to merge with a vertically extending chute 60 and a connecting duct 61 branched therefrom.

In FIG. 9 which is a purely schematical representation no mechanism for the operation of the drum is shown, such mechanism being of arbitrary construction, for example, corresponding to the embodiments described by reference to respectively FIGS. 1 to 3 and 6 to 8.

The connection of chute 60 with suction transport conduit 6 at the lower end of the chute will be in substantial agreement with previously described embodiments.

It may be mentioned that while the above described specific constructions of refuse receiving means comprising rotatable drums have been developed for use in self-contained inserting chutes, it is to be understood that the constructions may be used to advantage in connection with other inserting chutes, for example in dwelling houses where considerable amounts of garbage are to be introduced through a sluice mechanism.

Moreover, it is to be noted that other types of refuse receiving mechanisms might be used in connection with the selfcontained inserting columns in case particular conditions are prevailing regarding the composition and amount of the garbage or refuse, this being the case, for example, where the refuse receiving means in the first place are intended to replace conventional waste-paper baskets.

What we claim is:

1. In a sluice-like refuse-inserting means for attachment to the upper end of a chute forming part of a suction-operated refuse collecting system, said refuse-inserting means comprising: a housing with an inserting opening and, on a lower level, a discharge opening adapted to communicate with the upper end of a chute; a rotatable element bounding a refuse receiving cavity; and means for adjusting said element alternatively from one end position of rotation in which said cavity is accessible from the environment through said inserting opening and closed at said discharge opening and the other end position of rotation in which said cavity is inaccessible from the environment through said inserting opening and open at said discharge opening; the improvement wherein said rotatable element includes: a hollow cylindrical drum; means for rotating said drum approximately 90° about a horizontal axis behind said inserting opening; said drum having opposed first and second openings through the peripherhal surface of the drum with said second drum opening being of larger area than said first drum opening and wall means extending from the perimeter of said first opening to the perimeter of said second opening to delimit said cavity, said first drum opening being exposed behind the inserting opening in said housing in the one end position of drum rotation and said second drum opening being exposed in the discharge opening in said housing in the other end position of drum rotation for gravity discharge of refuse previously introduced into said cavity while simultaneously said first drum opening is exposed to the atmosphere in the interior of said housing.

2. The refuse-inserting means as defined in claim 1 wherein the refuse-inserting means is used in an outdoor refuse-receiving system, said outdoor refuse-receiving system comprising an underground suction conveying conduit connected to and forming part of a suction-operated refuse collecting system and a plurality of mutually spaced refusereceiving chutes at least some of which are self-contained posts accessible from public walking areas and which at the lower ends each are in refuse transferring communication with said conveying conduit, each such post being a hollow column provided at the upper end with one of said refuse inserting means.

3. The system as claimed in claim 2 in which every chute at its lower end is in permanently open communication with the suction conveying conduit.

4. The system as claimed in claim 3 in which the lower end of a chute is curved in smooth transition from a vertical to a substantially horizontal axial direction and is laterally attached to said suction conveying conduit.

5. The system as claimed in claim 3 wherein: means includes means for preventing air from being drawn into said chute via said refuse inserting means when said element is in said first position.

6. The system as claimed in claim 5 wherein the lower end of a chute is curved in smooth transition from a vertical to a substantially horizontal axial direction and is laterally attached to said suction conveying conduit.

7. The system as claimed in claim 2 in which the lower end of a chute forms a collecting room in which inserted refuse is collected on a valve element adapted to be opened periodically for introduction of the refuse into the suction conveying conduit.

8. The system as claimed in claim 2 in which the end of said suction conveying conduit remote from the attachment to the refuse collecting system is open to the atmosphere.

9. The system as claimed in claim 2 in which the end of said suction conveying conduit remote from the attachment to the refuse collecting system is provided with a valve adapted to be periodically opened for introduction of conveying air.

10. The system as claimed in claim 2 comprising a room which is accessible from the environment and which houses the connection of a chute to the suction conveying conduit.

11. The sluice-like means as claimed in claim 1 comprising a wall in the housing extending about a part of the circumference of the drum in a position to close said second drum opening in said one end position of drum rotation.

12. The sluice-like means as claimed in claim 1 in which a gasket extends around said discharge opening in a position sealingly to cooperate in the one end position of drum rotation with a portion of the drum wall intermediate said drum openings and in the other end position of drum rotation with a drum wall portion surrounding said second drum opening.

13. The sluice-like means as claimed in claim 1 comprising abutment means fixed to said drum and cooperating abutment means fixed to said housing and limiting the end positions of drum rotation.

14. The sluice-like means as claimed in claim 1 comprising a tubular insert extending through the wall of the housing and bounding said inserting opening, said tubular insert at the inner end conforming to the periphery of said drum in a position corresponding to the position of said first drum opening in the first end position of drum rotation, said tubular insert at the outer end being provided with a door movable between insert closing and insert exposing positions.

15. The sluice-like means as claimed in claim 1 in which said means for adjusting said element is a manually operable handle accessible for the user adjacent said inserting opening.

16. The sluice-like means as claimed in claim 1 in which said means for adjusting said element is a fluid motor and, means for releasing operation of the motor being are provided adjacent said inserting opening.

17. In a sluice-like refuse-inserting means for attachment to the upper end of a chute forming part of a suction-operated refuse collecting system, said refuse-inserting means comprising a housing with an inserting opening and, on a lower level, a discharge opening adapted to communicate with the upper end of a chute, an adjustable element bounding a refuse receiving cavity, and means for adjusting said element alternatively in a position in which said cavity is accessible from the environment through said inserting opening and closed at said discharge opening and a position in which said cavity is inaccessible from the environment through said inserting opening and open at said discharge opening; the improvement wherein: said adjustable element includes a hollow cylindrical drum, means for rotating said drum approximately 90° about a horizontal axis behind said inserting opening, said drum having opposed first and second openings through the peripheral surface of the drum, and wall means extending from the perimeter of said first opening to the perimeter of said second opening to delimit said cavity, said first drum opening being exposed behind the inserting opening in said housing in the one end position of drum rotation and said second drum opening being exposed in the discharge opening in said housing in the other end position of drum rotation for gravity discharge of refuse previously introduced into said cavity while simultaneously said first drum opening is exposed to the atmosphere in the interior of said housing; and said refuse inserting means further comprises a gasket extending around said discharge opening in a position sealingly to cooperate in said one end position of drum rotation with a portion of the drum wall intermediate said drum openings and in said other end position of drum rotation with a drum wall portion surrounding said second drum opening, and means resiliently supporting said drum in relation to opposed bearings fixed in said housing for permitting slight eccentric shift of said drum towards said gasket.

18. The sluice-like means as claimed in claim 17 comprising a wall in the housing extending in conforming relation about a part of the circumference of the drum in a position to close said second drum opening in said one end positions.

19. In a sluice-like refuse-inserting means for attachment to the upper end of a chute forming part of a suction-operated refuse collecting system, said refuse-inserting means comprising a housing having an inserting opening and, on a lower level, a discharge opening adapted to comunicate with the upper end of a chute, an adjustable element bounding a refuse receiving cavity, and means for adjusting said element alternatively in a position in which said cavity is accessible from the environment through said inserting opening and closed at said discharge opening and a position in which said cavity is inaccessible from the environment through said inserting opening and open at said discharge opening; the improvement wherein: said adjustable element includes a hollow cylindrical drum, means for rotating said drum approximately 90° about a horizontal axis behind said inserting opening, said drum having opposed first and second openings through the peripheral surface of the drum, and well means extending from the perimeter of said first opening to the perimeter of said second opening to delimit said cavity, said first drum opening being exposed behind the inserting opening in said housing in the one end position of drum rotation and said second drum opening being exposed in the discharge opening in said housing in the other end position of drum rotation for gravity discharge of refuse previously introduced into said cavity while simultaneously said first drum opening is exposed to the atmosphere in the interior of said housing; and wherein said refuse inserting means further comprises: a tubular insert extending through the wall of the housing and bounding said inserting opening, said tubular insert at the inner end conforming to the periphery of said drum in a position corresponding to the position of said first drum opening in said one end position of drum rotation, said tubular insert at the outer end being provided with a door movable between insert closing and insert exposing positions; and locking means cooperating with wall portions of said drum to permit a shift of said door to the insert exposing position only in said one end position of drum rotation.

* * * * *